United States Patent Office 3,057,912
Patented Oct. 9, 1962

3,057,912
PRODUCTION OF TRIMERIC LOWER ALKYL KETENES
Eduard Enk and Hellmuth Spes, Burghausen, Germany, assignors to Wacker-Chemie G.m.b.H., Munich, Germany
No Drawing. Filed Mar. 2, 1959, Ser. No. 796,226
Claims priority, application Germany Mar. 6, 1958
4 Claims. (Cl. 260—488)

The present invention relates to a process for the production of trimeric and hexameric alkyl ketenes beside dimeric alkyl ketenes.

It is known that ketene can easily be dimerized in suitable solvents. However, greater or smaller quantities of higher polymers of undefined polymerization degree are produced in addition to the main reaction product diketene. These higher polymers cannot be distilled and upon distillation of the diketene result in an unusable brown solid residue. The tetrameter of ketene, namely, dehydracetic acid, is known and can be prepared by dimerization of diketene. It is also known that liquified methyl ketene upon warming polymerizes at temperatures far below 0° C. whereby, in addition to small quantities of tetramers, dimers are primarily produced.

According to the invention it was unexpectedly found that the polymerization of the higher homologues of ketene—aldoketenes or alkyl ketenes—can under certain conditions be conducted in a different direction so that, instead of dimers, trimers are obtained as the main product, as well as small quantities of hexamers. This can be achieved in that the polymerization of the monomeric aldoketenes is carried out in the presence of a quantity of an inert solvent sufficient to produce a quantity of reaction product sufficient that the latter acts as solvent during the further progress of the reaction. Preferably, the quantity of solvent originally provided is only that which is sufficient to produce sufficient reaction product that the latter can then take over the function of the solvent.

The proportions of the individual polymers produced, that is, trimers and hexamers, can be so varied by selection of the type of the solvent and in some instances the quantity thereof that the hexameric polymer is the main product.

The production of trimers and hexamers in the process according to the invention is most surprising, as it was previously known only that ketenes could be dimerized and tetramerized and the trimeric or hexameric ketene mentioned below has not been described in the literature. Also, it was not to be expected that the polymerization of monomeric alkyl ketenes would proceed differently than that of ketene itself.

The process according to the invention can be varied within wide limits. Alkyl ketenes which to a far extent have been freed of the corresponding acid and water can be used as starting materials. They can be introduced, for example, under the vacuum under which they were prepared into a solvent, such as methyl propionate, which is inert with respect to the alkyl ketenes. Preferably, only a quantity of foreign inert solvent is employed to initiate the polymerization to produce a sufficient quantity of polymerization product so that the latter can take over the function of the solvent and, for example, in a continuous process with recycling of the solvent medium gradually replace the solvent initially employed. The polymerization can, however, also be carried out in the continuous presence of the solvent originally supplied. Also, the reaction product of a previous run can be employed initially as the solvent medium. Suitable inert solvents, for example, are ethers, esters, anhydrides, hydrocarbons, chlorinated hydrocarbons and the like. The reactive alcohols, water, organic bases and the like, on the other hand, are unsuitable.

The polymerization according to the invention can also be carried out in the presence of 0.1–10% of a polymerization inhibitor, such as hydroquinone, in order to reduce the quantity of higher polymers produced.

The polymerization, for example, can be carried out continuously by passing the gaseous alkyl ketene through a washing tower countercurrently to the solvent medium which is recycled with a recycling pump. After the process is underway a portion of the recycled solvent medium containing the polymers produced can be withdrawn proportionately to the quantity of polymers produced. The solvent medium cycle is cooled to withdraw the heat of reaction. Preferably, the temperature at which the polymerization is carried out does not exceed about 50–70° C. as the trimer produced changes at higher temperatures with the production of higher polymers. Preferably, the polymerization is carried out at a subatmospheric pressure, for example between 30 mm. Hg and 600 mm. Hg.

The process according to the invention can also be carried out discontinuously by absorbing the alkyl ketene starting material in an appropriate quantity of the solvent medium.

The polymerization according to the invention can be carried out at temperatures between −80° C. and +70° C. provided the temperature selected is such that the solvent medium employed is still liquid.

The trimeric aldoketenes produced are yellow oily liquids, which in view of their thermal instability can only be distilled under high vacuum. Under normal vacuum the boiling point of the trimers is over the decomposition temperature so that large parts of the trimers are transformed into clear higher polymeric compounds of resinous character with strong evolution of heat. The odor of the trimers is somewhat musty but not as sharp as in the case of the dimers.

The hexameric aldoketenes are colorless, odorless, crystalline compounds and can be recrystallized from water and ethyl acetate.

Both the trimers and the hexamers are reactive compounds and can be subject to most reactions to which diketene can be subjected. In view of their capacity for spontaneous polymerization to shellac like resins at only slightly raised temperatures they can be used as a lacquer base. In addition, in unpolymerized state they can be used as plasticizers.

The following examples will serve to illustrate the invention with reefrence to several specific embodiments thereof.

Example 1

7750 g. of methyl ketene were introduced into a scrubbing apparatus at a pressure of 60 mm. Hg at a velocity of 1000 g. per hour. 2755 g. of propionic acid anhydride were sprayed into this scrubbing apparatus and recycled. A reaction temperature of below 45° C. was maintained. 10,500 g. of reaction solution resulted. The reaction solution was subjected to high vacuum distillation and in addition to the propionic acid anhydride originally introduced the following were recovered:

| | Percent of the methyl ketene introduced |
|---|---|
| Dimeric methyl ketene, 985 g. | 12.7 |
| Trimeric methyl ketene, 5,910 g. | 76.3 |
| Polymeric distillation residue, 829 g. | 10.7 |

The trimeric methyl ketene was a yellow oily liquid which did not have a sharp odor. Its boiling point at a pressure of 0.01 mm. Hg was 46° C. The calculated molecular weight thereof is 168. Upon analysis of the product recovered, it was found that its molecular weight was 164, its carbon content 64.46%, its hydrogen content 6.96% and its oxygen content 28.34% (Calc. C=64.30%, H=7.15% and O=28.55%).

Example 2

5670 g. of methyl ketene was treated in a scrubbing apparatus as in Example 1, except that 3200 g. of methyl propionate containing 2% of hydroquinone dissolved therein was used as the recycled solvent medium and the reaction temperature was maintained at 0° C. A cooled trap was connected to the apparatus. 7610 g. of reaction solution were produced (1200 g. of condensate primarily consisting of methyl propionate were recovered from the trap). Upon distilling off the solvent under vacuum from the reaction solution and further distillation under high vacuum the following were recovered:

| | Percent of methyl ketene introduced |
|---|---|
| Dimeric methyl ketene, 539 g. | 9.5 |
| Trimeric methyl ketene, 3,480 g. | 61.4 |
| Polymeric distillation residue, 317 g. | 5.6 |
| Propionic acid anhydride, 1,333 g. | 23.5 |

Example 3

3.5 liters of methyl propionate containing 2% of hydroquinone were recycled through a scrubber with the aid of a pump. Ethyl ketene was introduced into this scrubber at a rate of 900 g. per hour at 0° C. and a pressure of 60 mm. Hg until the volume of the reaction solution had increased to 5.7 liters.

Upon distilling off the solvent from 1881 g. of the reaction solution and high vacuum distillation the following were recovered:

| | Percent of reaction product |
|---|---|
| Methyl propionate, 723 g. | |
| Dimeric ethyl ketene, 115 g. | 10 |
| Butyric acid anhydride, 279.3 g. | 24.1 |
| Trimeric ethyl ketene, 536.1 g. | 46.4 |
| Polymeric residue, 215.5 g. | 18.6 |

The trimeric ethyl ketene was a yellow oil having a boiling point of 62.5–65° C. at 0.01 mm. Hg pressure. The calculated molecular weight for $(C_4H_6O)_6$ is 210. Upon analysis of the trimeric product it was found that its molecular weight was 201.0, its carbon content 68.28%, its hydrogen content 8.48% and its oxygen content 23.24% (Calc. C=68.50%, H=8.65% and O=22.85%).

Example 4

3394 g. of isopropyl ketene were introduced into a scrubber at a rate of 848 g. per hour under a pressure of 55 mm. Hg. The scrubber was maintained at −5 to 0° C. and was sprayed with 2500 g. of recycled isovaleric acid anhydride. The introduction of the isopropyl ketene was continued until the weight of the reaction solution was 5600 g.

Upon high vacuum distillation of the reaction solution after the original 2500 g. of isovaleric acid anhydride had been distilled off the following were recovered:

| | Percent of the ketene introduced |
|---|---|
| Dimeric isopropyl ketene, 312 g. | 9.2 |
| Isovaleric acid anhydride, 200 g. | 5.9 |
| Trimeric isopropyl ketene, 1940 g. | 57.2 |
| Fraction boiling at 81–119° C. at 0.6 mm. Hg. 183 g. | 5.4 |
| Polymeric residue, 288 g. | 8.5 |

The fraction boiling at 81–119° C. at 0.6 mm. Hg was an inhomogeneous mixture of higher polymers. The trimeric isopropyl ketene $(C_5H_8O)_3$ boiled at 77–81° C. at a pressure of 0.01 mm. Hg and was of the following analysis: Mol. wt.—248; carbon content, 70.57%; hydrogen content, 9.53%; oxygen content, 10.61%; (Calc. mol. wt.=252, C=71.40%, H=9.50%, O=19.10%).

Example 5

3520 g. of methyl ketene were introduced into a scrubber at a pressure of 80 mm. Hg and a rate of 960 g. per hour. The scrubber was maintained at −5 to 0° C. and was sprayed with 2500 g. of recycled solvent medium which was obtained upon distilling off the original solvent from the reaction solution of Example 2. (The recycled solvent medium consisted of 225 g. of dimeric, 1535 g. trimeric and 140 g. of polymeric methyl ketene, as well as 587 g. of propionic acid anhydride.) The introduction of the methyl ketene into the scrubber was continued until the weight of the reaction solution was 5980 g. The reaction solution was distilled under high vacuum as described in the previous examples and 670 g. of dimeric, 4007 g. of trimeric, 516 g. of polymeric methyl ketene and 775 g. of propionic acid anhydride recovered therefrom.

Therefore after deducting the quantities introduced with the original solvent medium the following represent the yields produced:

| | Percent of methyl ketene introduced |
|---|---|
| Dimeric methyl ketene, 445 g. | 12.6 |
| Trimeric methyl ketene, 2,472 g. | 70.2 |
| Polymeric methyl ketene, 376 g. | 10.7 |
| Propionic acid anhydride, 188 g. | 5.4 |

We claim:
1. A process for the continuous production of trimeric lower alkyl ketenes which comprises providing an inert liquid solvent medium, continuously supplying monomeric lower alkyl ketene to such solvent medium under vacuum at a temperature between −30° C. and below 45° C., the quantity of solvent medium provided being sufficient to cause initiation of the polymerization of the alkyl ketene to produce sufficient liquid reaction product to serve as inert liquid solvent medium for absorbing and reacting further quantities of lower alkyl ketene and continuously supplying further quantities of lower alkyl ketene to such liquid reaction product at a temperature between −30 and below 45° C. under vacuum.

2. The process of claim 1 in which said solvent medium contains 0.1 to 10% of a polymerization inhibitor.

3. The process of claim 1 in which the monomeric alkyl ketene is absorbed in a scrubber sprayed with the liquid inert solvent medium.

4. A trimeric lower alkyl ketene.

References Cited in the file of this patent

UNITED STATES PATENTS

| 1,942,110 | Low | Jan. 2, 1934 |
| 2,229,204 | Boese | Jan. 21, 1941 |
| 2,476,860 | Hagemeyer | July 19, 1949 |

FOREIGN PATENTS

| 848,190 | Germany | Sept. 1, 1952 |

OTHER REFERENCES

Chemical Abstracts, vol. 45, page 1124a, 1951.
Staudinger: Ber. Deut. Chem., vol. 44, pp. 533–43 (1911).